US012586769B2

(12) United States Patent
Upadhya P et al.

(10) Patent No.: US 12,586,769 B2
(45) Date of Patent: Mar. 24, 2026

(54) PARALLEL PROCESSING AND HORIZONTAL SCALING FOR PEAK DETECTION

(71) Applicants: Thermo Finnigan LLC, San Jose, CA (US); DIONEX CORPORATION, Sunnyvale, CA (US)

(72) Inventors: Sumanth Upadhya P, San Jose, CA (US); Hung Q Vu, San Jose, CA (US)

(73) Assignees: Thermo Finnigan LLC, San Jose, CA (US); Dionex Corporation, Sunnyvale, CA (US)

( * ) Notice: Subject to any disclaimer, the term of this patent is extended or adjusted under 35 U.S.C. 154(b) by 497 days.

(21) Appl. No.: 18/313,241

(22) Filed: May 5, 2023

(65) Prior Publication Data

US 2024/0371619 A1 Nov. 7, 2024

(51) Int. Cl.
*H01J 49/00* (2006.01)

(52) U.S. Cl.
CPC .................................. *H01J 49/009* (2013.01)

(58) Field of Classification Search
USPC .......................................................... 250/282
See application file for complete search history.

(56) References Cited

U.S. PATENT DOCUMENTS

2017/0356889 A1* 12/2017 Nakakimura ....... H01J 49/0036
2022/0178888 A1* 6/2022 Maeda .................. G01N 30/72

OTHER PUBLICATIONS

International Search Report and Written Opinion for Application No. PCT/US2024/026976 dated Sep. 17, 2024 (12 pages).
Emami Khoonsari, P., et al. "Interoperable and scalable data analysis with microservices: applications in metabolomics." Bioinformatics 35.19 (2019): 3752-3760.
Katajamaa, M. et al. "MZmine: toolbox for processing and visualization of mass spectrometry based molecular profile data." Bioinformatics 22.5 (2006): 634-636.
Hillman, C. et al. "Real-time processing of proteomics data: the internet of things and the connected laboratory." 2016 IEEE International Conference on Big Data (Big Data). IEEE, 2016 (1-8).
Zoun, R. Analytic cloud platform for near real-time mass spectrometry processing on the fast data architecture. Diss. 2020. Universitat Madgeburg, (150 pages).
Tzanakis, K., et al. "MetHoS: a platform for large-scale processing, storage and analysis of metabolomics data." BMC bioinformatics 23.1 (2022): 267.

* cited by examiner

*Primary Examiner* — Kiet T Nguyen
(74) *Attorney, Agent, or Firm* — Michael Best & Friedrich LLP

(57) ABSTRACT

Disclosed herein are scientific instrument support systems, as well as related methods, computing devices, and computer-readable media. For example, in some embodiments, a scientific instrument support apparatus may include: first logic to receive, from a mass spectrometer, injections data for each of a plurality of injections associated with a sample; second logic to determine peak data for each of the plurality of injections by executing, in parallel on a node, a peak detection algorithm for each of the plurality of injections, third logic to collate the peak data for each of the plurality of injections; and fourth logic to provide the collated peak data for further processing.

20 Claims, 6 Drawing Sheets

PARALLEL PROCESSING AND HORIZONTAL SCALING FOR PEAK DETECTION

FIELD

Mass spectrometry is an analytical technique that is used to measure the mass-to-charge ratio of ions. The results are presented as a mass spectrum, a plot of intensity as a function of the mass-to-charge ratio. Mass spectrometry is used in various fields and is applied to pure samples as well as complex mixtures.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

Figure 1:
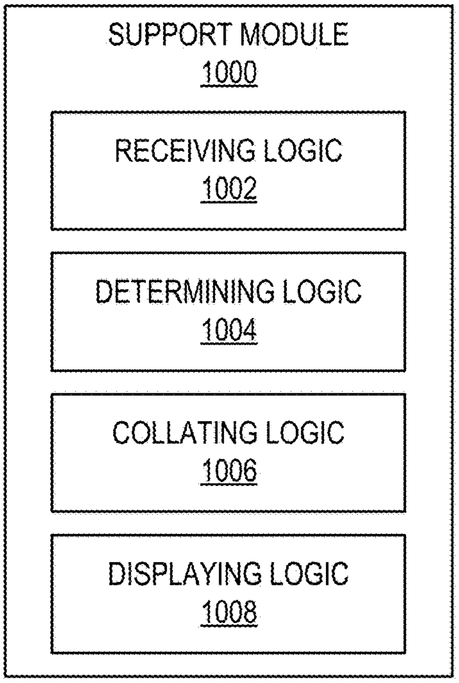
FIG. 1 is a block diagram of an example scientific instrument support module implementing logic for performing perform an inference on a previously unseen sample, in accordance with various embodiments.

Disclosed herein are scientific instrument support systems, as well as related methods, computing devices, and computer-readable media. For example, in some embodiments, a scientific instrument support apparatus may include: first logic to receive, from a mass spectrometer, injections data for each of a plurality of injections associated with a sample; second logic to determine peak data for each of the plurality of injections by executing, in parallel on a node, a peak detection algorithm for each of the plurality of injections, third logic to collate the peak data for each of the plurality of injections; and fourth logic to provide the collated peak data for further processing.

In mass spectrometry, peak detection is an important step during data analysis for determining the composition of a sample. Typically, after data acquisition for a sample, a sequence of injections is generated per an experiment where each of these injections is analyzed. Generally, based on the experiment type, a peak detection algorithm is employed to analyze each of these injections, which is a time-consuming process because, for example, individual .raw files are extracted for each algorithm. As used here, experiment type refers to what type of analysis the user is performing (e.g., pesticide analysis, water purity, and the like). Generally, a user can select an appropriate algorithm for peak detection based on the experiment type, parameters, or a combination thereof.

In some embodiments, the systems and methods described herein employ a processing module that parallelizes the data extraction and peak detection of each injection, which improves performance and provides faster processing times for data analysis (that includes peak detection for a sequence of injections). In mass spectrometry, injection generally refers to the process of introducing a sample into the instrument for analysis. Injections can be classified as either direct or indirect. Direct injection involves introducing a sample directly into the mass spectrometer, while indirect injection involves introducing the sample into a separate device, such as a gas chromatograph, which then introduces the sample into the mass spectrometer.

In some embodiments, the systems and methods described herein employ extraction algorithms and detection algorithms that are optimized for application containers, such as, for example, Linux containers. In one embodiment, the algorithms are optimized via an application programming interface (API) using dotnet core. An application container is a stand-alone, all-in-one package for a software application, which allows the software application to run quickly and reliably from one computing environment to another. In some embodiments, the systems and methods described herein employs a processing module where these optimized algorithms are executed in parallel by leveraging a computing platform configured to manage containerized workloads and services, such as, for example, the Kubernetes infrastructure (e.g., via Kubernetes clusters/pods). Within the Kubernetes platform, a pod includes a group of one or more containers, with shared storage and network resources, and a specification for how to run the containers. The containers included in a pod run in a shared context (e.g., a set of Linux namespaces, cgroups, and the like). A cluster is a group of one or more related or unrelated pods.

When multiple applications are executed on a single physical server, resource allocation issues can arise as the application compete for server resources. One way to address this issue is to run each application on a different physical server, but this solution requires significant investment and often results in underutilized resources. Rather than using separate physical servers, virtual machine (VMs) can be used, wherein multiple VMs can be run on a single physical server and the VMs provides isolation between the applications. This type of virtualization provides better utilization of resources and easily allows additional applications to be added. However, each VM is operated like a full machine running on virtualized hardware and, thus, each VM requires its own operating system (OS), which wastes central processing unit (CPU) and memory resources.

Containers, such as Kubernetes containers, operate similar to a virtual machine, wherein each container has its own CPU share, filesystem, process space, and memory, but, unlike a virtual machine, containers allow applications to share the OS. Just as each container has separate virtual memory and processing, in some embodiments, a pod includes separate (from the other pods) virtual memory and processing.

Extraction in mass spectrometry generally refers to the process of separating the molecule of interest from other substances in a sample so that it can be more easily and accurately analyzed by a mass spectrometer. Also, peak detection is generally performed post data extraction. In some embodiments, as described in more detail below, the extraction and peak detection algorithms are executed in parallel in a separate pod for each injection. In some embodiments, the determined data is collated and provided to the calling application. In some embodiments, extraction and peak detection algorithms employed for peak detection include, for example, ICIS, GENISIS, or Cobra.

In some embodiments, the processing module is scaled horizontally via processing nodes to increase performance. In some embodiments, a node is implemented via a virtual machine or a physical machine. In some embodiments, a node is implemented as a Kubernetes node and managed by the control plane and contains the services necessary to run Pods. In some embodiments, additional Kubernetes nodes are employed to horizontally scale the processing module. In some embodiments, the processing module is provided via multiple CPUs that are scaled horizontally where each node is a physical server, and each pod comprises a virtual CPU and virtual memory (see FIG. 5).

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an embodiment," "various embodiments," and "some embodiments," each of which may refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y. As used herein, an "apparatus" may refer to any individual device, collection of devices, part of a device, or collections of parts of devices. The drawings are not necessarily to scale.

FIG. 1 is a block diagram of a scientific instrument support module 1000 for performing support operations, in accordance with various embodiments. The scientific instrument support module 1000 may be implemented by circuitry (e.g., including electrical and/or optical components), such as a programmed computing device. The logic of the scientific instrument support module 1000 may be included in a single computing device or may be distributed across multiple computing devices that are in communication with each other as appropriate. Examples of computing devices that may, singly or in combination, implement the scientific instrument support module 1000 are discussed herein with reference to the computing device 4000 of FIG. 7, and examples of systems of interconnected computing devices, in which the scientific instrument support module 1000 may be implemented across one or more of the computing devices, is discussed herein with reference to the scientific instrument support system 5000 of FIG. 8.

The scientific instrument support module 1000 may include receiving logic 1002, determining logic 1004, collating logic 1006, and displaying logic 1008. As used herein, the term "logic" may include an apparatus that is to perform a set of operations associated with the logic. For example, any of the logic elements included in the support module 1000 may be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform one or more functions associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module may not include all of the logic elements depicted in the associated drawing; for example, a module may include a subset of the logic elements depicted in the associated drawing when that module is to perform a subset of the operations discussed herein with reference to that module. Accordingly, in the claims, if an apparatus, method, or system is claimed, for example, as including a computing device, logic element, module, or other element configured in a certain manner, for example, to perform multiple functions, the claim or claim element should be interpreted as meaning one or more computing devices, logic elements, modules, or other elements where any one of the one or more elements is configured as claimed, for example, to make any one or more of the recited multiple functions.

The receiving logic 1002 may be configured to receive a sequence that includes injection data related to a plurality of injections. In some embodiments, the sequence is received from a mass spectrometer or via a GUI, such as the GUI 3000 of FIG. 6. In some embodiments, the sequence is generated per an experiment where each of the plurality of injections is analyzed. In some embodiments, receiving logic 1002 is configured to receive a plurality of sequences, wherein each of the plurality of sequences are each processed horizontally via a respective node.

The determination logic 1004 may be configured to determine peak data for each of the injections by processing the injection data through a processing module. In some embodiments, the processing module is configured to execute, in parallel, a peak detection algorithm for each of the injections included in a sequence to determine the respective peak data. In some embodiments, the processing module is configured to execute, in parallel, extraction and peak detection algorithms for each of the plurality of injections included in a sequence to determine the respective peak data.

As noted above, the extraction and peak detection algorithm may be optimized for an application container, such as, for example, Linux containers. In some embodiments, extraction and peak detection logic is extracted and added into a new project using Microsoft® Dotnet core. In such embodiments, a docker image(s) is generated by packaging the required artifacts into the image. The docker image(s) is then deployed in a container(s). For example, in some embodiments, the processing module executes the optimized algorithms in parallel by leveraging a Kubernetes infrastructure. In some embodiments, the extraction and peak detection algorithms are executed in parallel using a separate pod for each of the injections. In some embodiments, extraction and peak detection algorithms employed for peak detection include, for example, ICIS, GENISIS, or Cobra and a container may be configured to apply one or more of such algorithms (e.g., according to configuration data set for the container). Also, in some embodiments, different containers may be used to execute (e.g., in parallel) different peak detection algorithms for a single injection, which, again, improves data processing efficiency and CPU and memory usage.

As noted above, in some embodiments, the processing module is scaled horizontally via processing nodes to increase performance. In some embodiments, additional Kubernetes nodes are employed to horizontally scale the processing module. In some embodiments, the processing module is provided via multiple CPUs that are scaled horizontally where each node is a physical server, and each pod is a virtual CPU and virtual memory (see FIG. 5).

The collating logic 1004 may be configured to collate the peak data determined for each of the injections. In some embodiments, the peak data is collated (e.g., combined or grouped) based on the respective injections or sequence(s). In some embodiments, the determined data is collated and provided to a calling application (see FIGS. 3-5). In some embodiments, the display logic 1008 may provide to a user, through a GUI (such as the GUI 3000 of FIG. 6), the collated peak data.

Figure 2A:
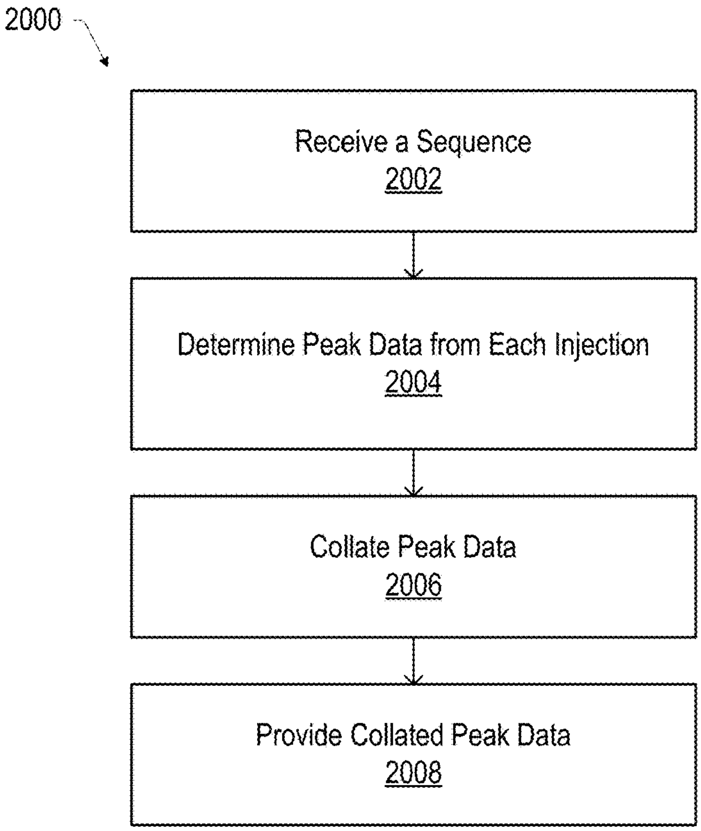
FIGS. 2A-C are flow diagrams of example methods performed by the scientific instrument support module of FIG. 1, in accordance with various embodiments.
Figure 2B:
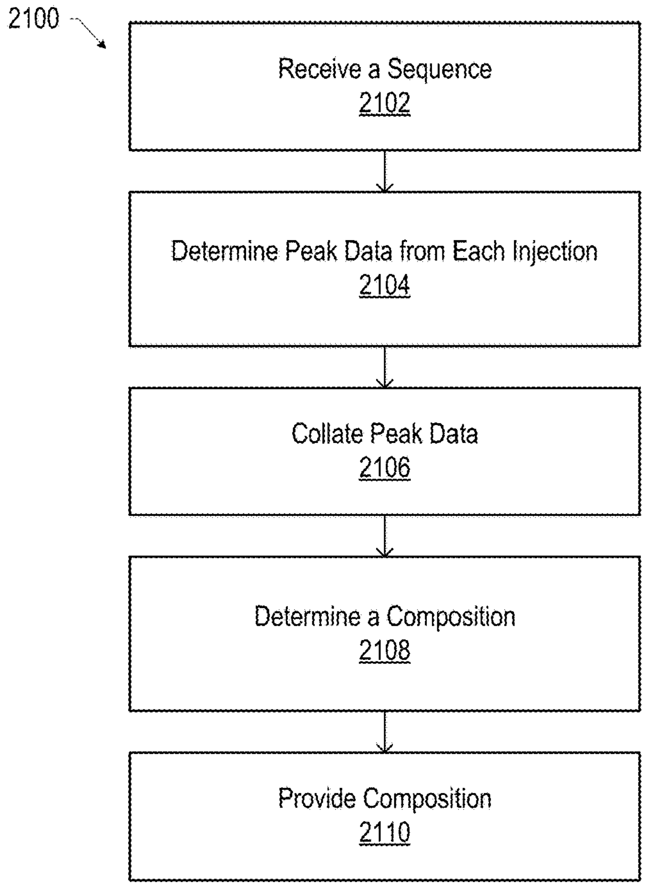
Figure 2C:
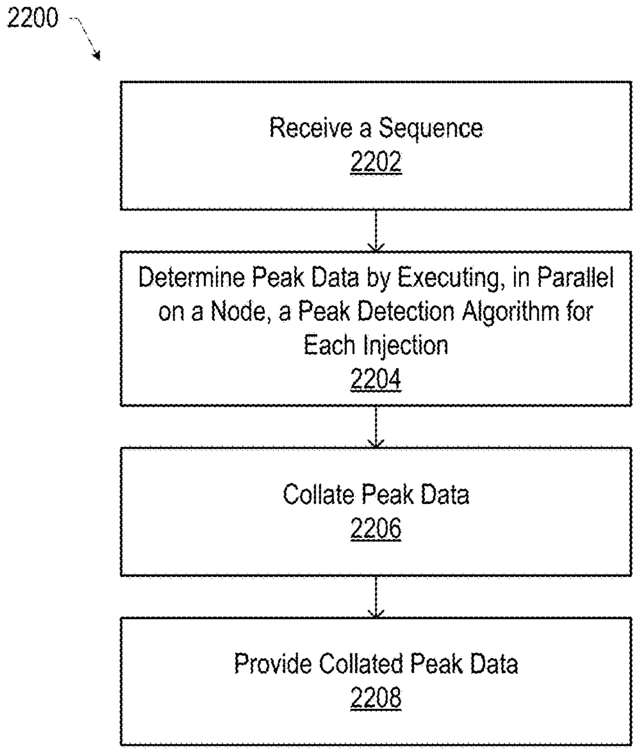

FIGS. 2A-2C each depict a flow diagram of a method 2000, 2100, and 2200 respectively of performing support operations, in accordance with various embodiments. Although the operations of the methods 2000, 2100, and 2200 may be illustrated with reference to particular embodiments disclosed herein (e.g., the scientific instrument support module 1000 discussed herein with reference to FIG. 1, the GUI 3000 discussed herein with reference to FIG. 6, the computing devices 4000 discussed herein with reference to FIG. 7, and/or the scientific instrument support system 5000 discussed herein with reference to FIG. 8), the methods 2000, 2100, and 2200 may be used in any suitable setting to perform any suitable support operations. Operations are illustrated once each and in a particular order in FIG. 2A-2C, but the operations may be reordered and/or repeated as desired and appropriate (e.g., different operations performed may be performed in parallel, as suitable).

For method 2000, at 2002, first operations may be performed. For example, the receiving logic 1002 of the support module 1000 may perform the operations of 2002. The first operations may include receiving, from a mass spectrometer, injections data for each of a plurality of injections associated with a sample.

At 2004, second operations may be performed. For example, the determining logic 1004 of the support module 1000 may perform the operations of 2004. The second operations may include determining peak data for each of the plurality of injections by executing, in parallel on a node, a peak detection algorithm for each of the plurality of injections.

At 2006, third operations may be performed. For example, the collating logic 1006 of the support module 1000 may perform the operations of 2006. The third operations may include collating the peak data for each of the plurality of injections.

At 2008, fourth operations may be performed. For example, the support module 1000 may be configured to perform the operations of 2008. The fourth operations may include providing the collated peak data for further processing.

For method 2100, at 2102, first operations may be performed. For example, the receiving logic 1002 of the support module 1000 may perform the operations of 2102. The first operations may include receiving, from a mass spectrometer, injections data for each of a plurality of injections associated with a sample.

At 2104, second operations may be performed. For example, the determining logic 1004 of the support module 1000 may perform the operations of 2104. The second operations may include determining peak data for each of the plurality of injections by executing, in parallel on a node, a peak detection algorithm for each of the plurality of injections.

At 2106, third operations may be performed. For example, the collating logic 1006 of the support module 1000 may perform the operations of 2106. The third operations may include collating the peak data for each of the plurality of injections.

At 2108, fourth operations may be performed. For example, the determining logic 1004 of the support module 1000 may perform the operations of 2108. The fourth operations may include determining a composition of the sample based on the collated peak data.

At 2110, fifth operations may be performed. For example, the displaying logic 1008 of the support module 1000 may perform the operations of 2110. The fifth operations may include providing the composition of the same for display.

For method 2200, at 2202, first operations may be performed. For example, the receiving logic 1002 of the support module 1000 may perform the operations of 2202. The first operations may include receiving, from a mass spectrometer, injections data for each of a plurality of injections associated with a sample.

At 2204, second operations may be performed. For example, the determining logic 1004 of the support module 1000 may perform the operations of 2204. The second operations may include determining peak data for each of the plurality of injections by executing, in parallel on a node, a peak detection algorithm for each of the plurality of injections, wherein the node is executed by a second processing device.

At 2206, third operations may be performed. For example, the collating logic 1006 of the support module 1000 may perform the operations of 2206. The third operations may include collating the peak data for each of the plurality of injections.

At 2208, fourth operations may be performed. For example, the support module 1000 may be configured to perform the operations of 2208. The fourth operations may include providing the collated peak data for further processing.

Example Systems

Figure 3:
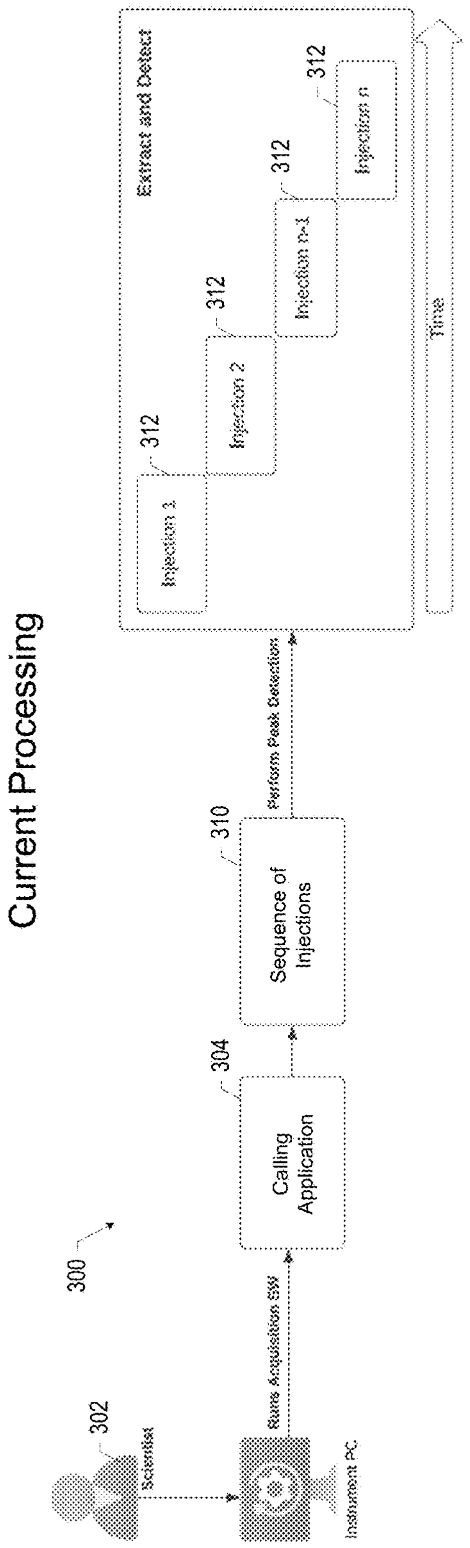
FIG. 3 depicts an example system for processing a plurality of injections included in a sequence are processed in sequential order.

FIG. 3 depicts an example system 300 where each of a plurality of injections included for example in a sequence 310 are processed in sequential order when provided by a calling application 302 (e.g., Chromeleon). As depicted, peak detection is done sequentially where an individual raw file is extracted for one injection and then a peak detection algorithm 312 is applied to the extracted raw file. Once extraction and peak detection 312 is completed for one injection, the next injection is selected and extraction and peak detection 312 is performed for the selected injection. When raw files are extracted and processed sequentially, a researcher or a scientist (user) 302 who is performing an experiment may have to wait hours before the files for all of the injections included in a sequence 310 to be completed and before the user 302 can analyze the respective experiment results. To address these and other issues, systems and methods described herein improve performance of mass spectrometry technology through the use of containers and parallel and horizontal processing, which results in faster data processing and results.

Figure 4:
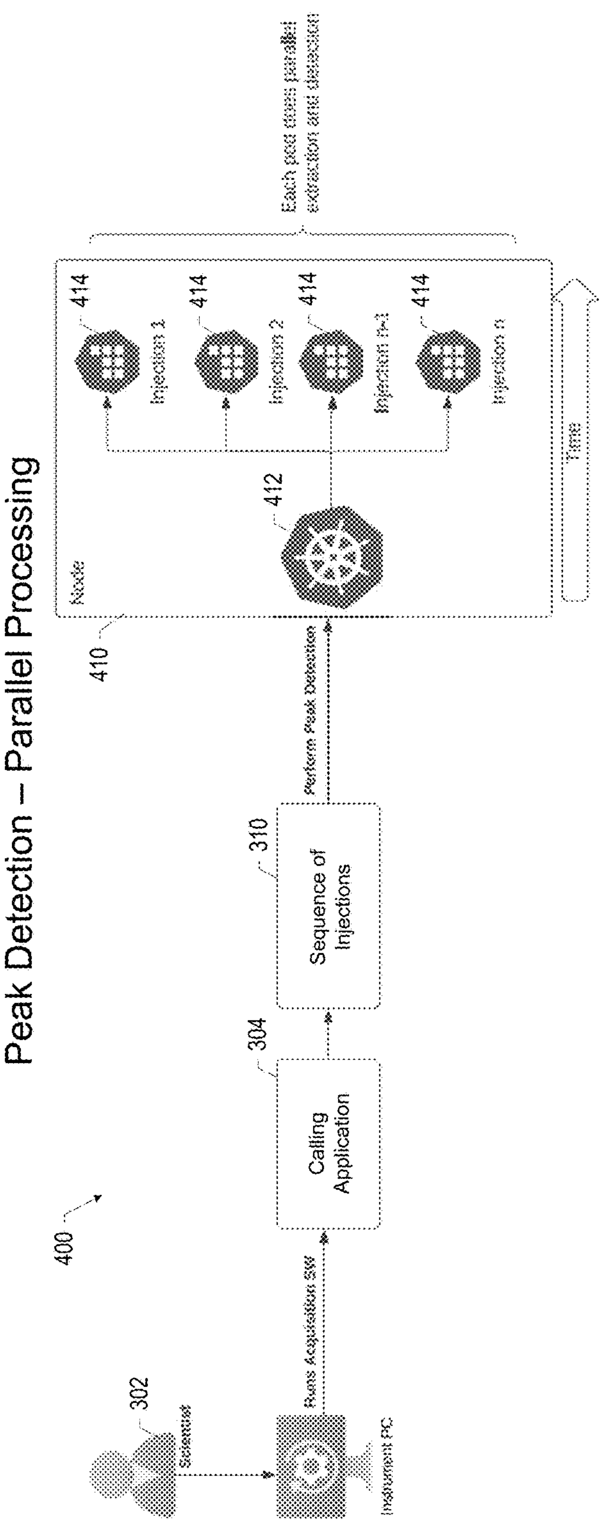
FIG. 4 depicts an example system for processing a plurality of injections included in a sequence in parallel, in accordance with various embodiments.

For example, FIG. 4 depicts an example system 400, according to some embodiments, where a calling application 302 provides a sequence of injections 310. As described above, within the Kubernetes node 410 the processing module 412 instantiates a pod 414 for each of the injections included in the sequence 310, which are executed in parallel. Within each of the pods 414, the raw file corresponding to each of a plurality of injections included in the sequence 310 is processed (for example, according to the method 2000).

Figure 5:
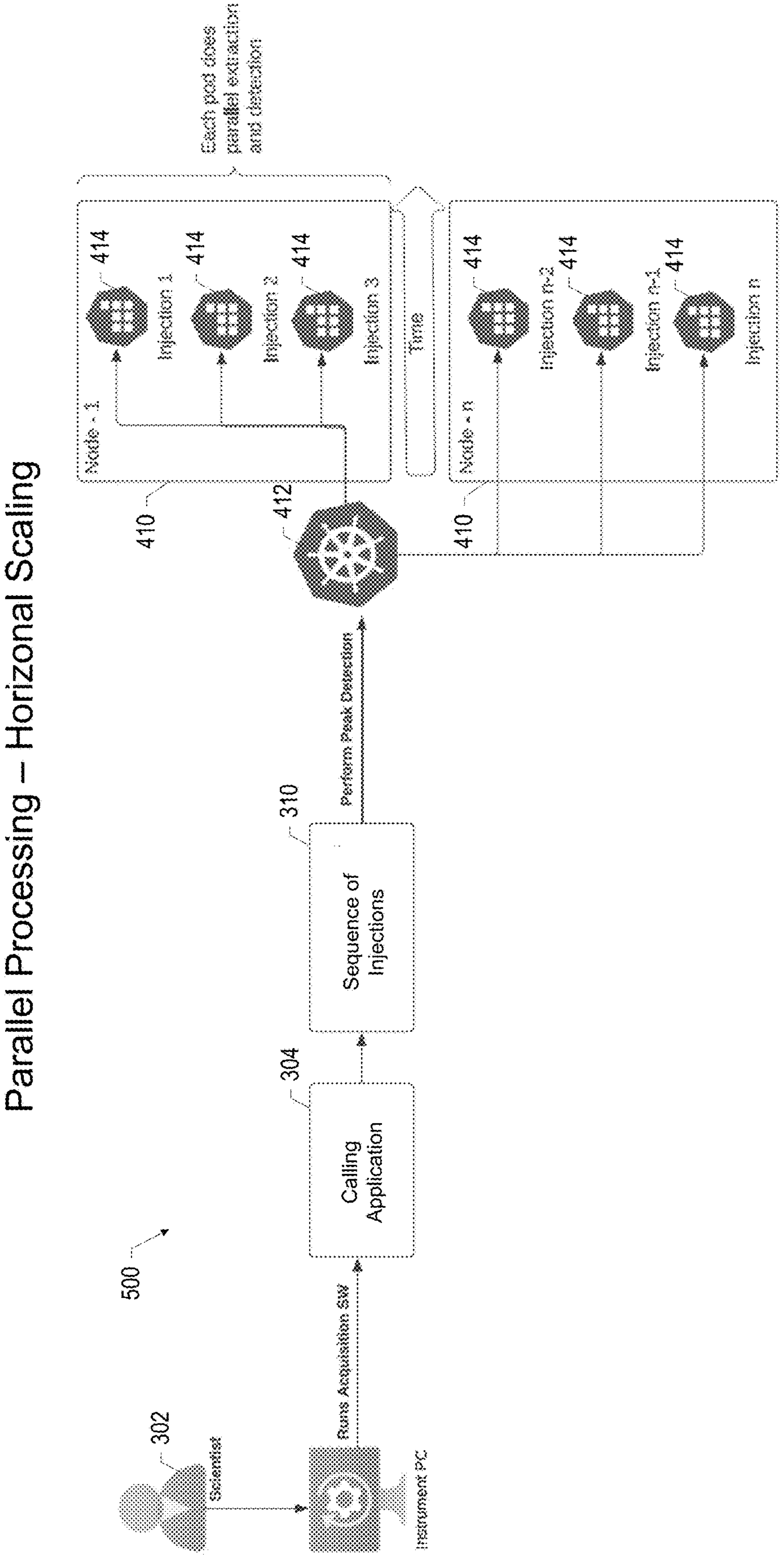
FIG. 5 depicts an example system for processing a plurality of injections included in a sequence in parallel using horizontal scaling, in accordance with various embodiments.

FIG. 5 depicts an example system 500, according to embodiments of the current disclosure, where the processing module is scaled horizontally via processing nodes to increase performance. As depicted, when a calling application 302 provides a sequence of injections 310, additional Kubernetes nodes 410 are employed to horizontally scale the processing module 412 (for example, according to method 2200). In some embodiments, the processing module 412 is provided via multiple CPUs that are scaled horizontally where each node 410 is a physical server, and each pod 414 is a virtual CPU and virtual memory.

User Interface

Figure 7:
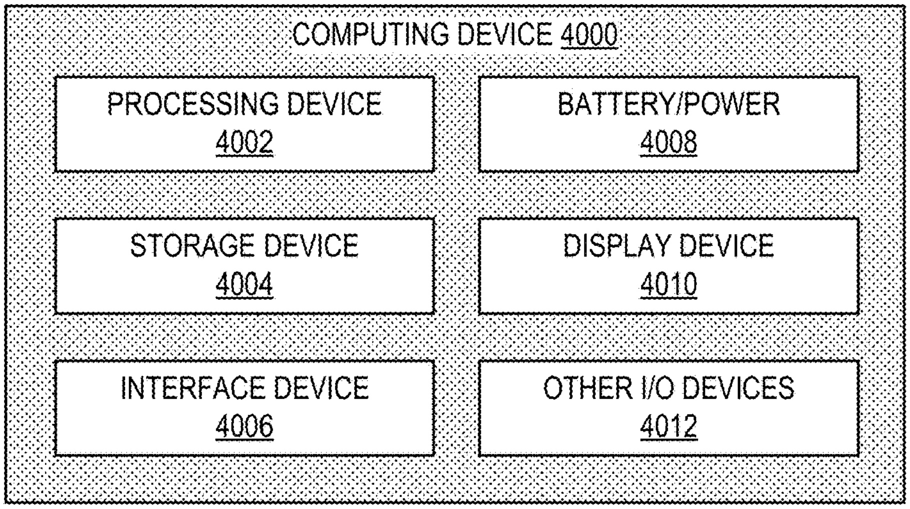
FIG. 7 is a block diagram of an example computing device that may perform some or all of the scientific instrument support methods disclosed herein, in accordance with various embodiments.
Figure 8:
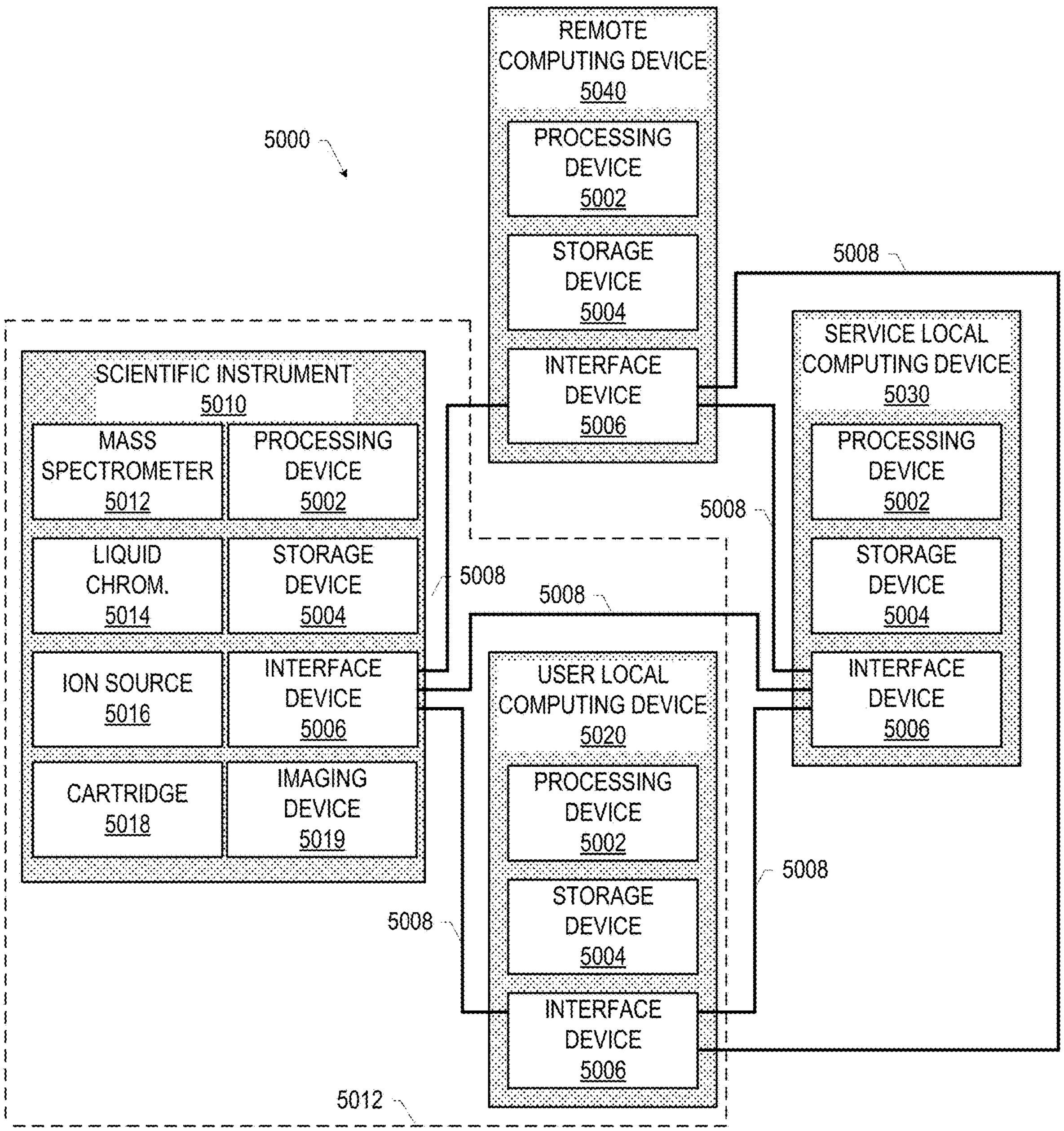
FIG. 8 is a block diagram of an example scientific instrument support system in which some or all of the scientific instrument support methods disclosed herein may be performed, in accordance with various embodiments.

The scientific instrument support methods disclosed herein may include interactions with a human user (e.g., via the user local computing device 5020 discussed herein with reference to FIG. 8). These interactions may include providing information to the user (e.g., information regarding the operation of a scientific instrument such as the scientific instrument 5010 of FIG. 8, information regarding a sample being analyzed or other test or measurement performed by a scientific instrument, information retrieved from a local or remote database, or other information) or providing an option for a user to input commands (e.g., to control the operation of a scientific instrument such as the scientific instrument 5010 of FIG. 8, or to control the analysis of data generated by a scientific instrument), queries (e.g., to a local or remote database), or other information. In some embodiments, these interactions may be performed through a GUI that includes a visual display on a display device (e.g., the display device 4010 discussed herein with reference to FIG. 7) that provides outputs to the user and/or prompts the user to provide inputs (e.g., via one or more input devices, such as a keyboard, mouse, trackpad, or touchscreen, included in the other I/O devices 4012 discussed herein with reference to FIG. 7). The scientific instrument support systems disclosed herein may include any suitable GUIs for interaction with a user.

Figure 6:
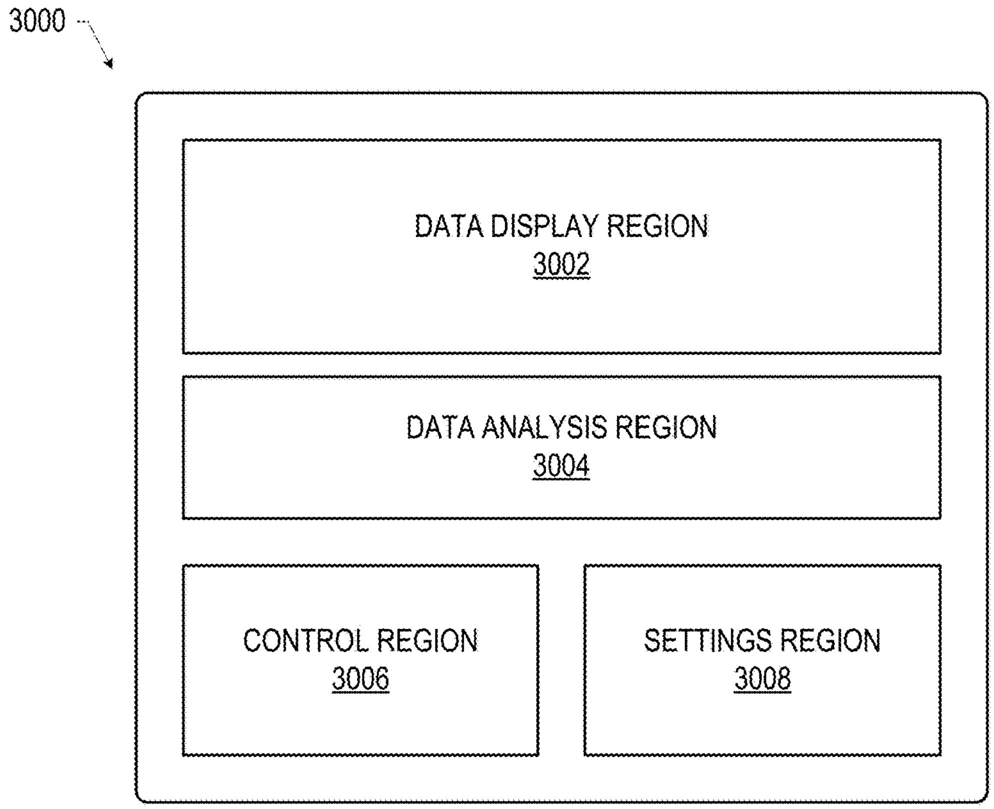
FIG. 6 is an example of a graphical user interface (GUI) that may be used in the performance of some or all of the support methods disclosed herein, in accordance with various embodiments.

FIG. 6 depicts an example GUI 3000 that may be used in the performance of some or all of the support methods disclosed herein, in accordance with various embodiments. As noted above, the GUI 3000 may be provided on a display device (e.g., the display device 4010 discussed herein with reference to FIG. 7) of a computing device (e.g., the computing device 4000 discussed herein with reference to FIG. 7) of a scientific instrument support system (e.g., the scientific instrument support system 5000 discussed herein with reference to FIG. 8), and a user may interact with the GUI 3000 using any suitable input device (e.g., any of the input devices included in the other I/O devices 4012 discussed herein with reference to FIG. 7) and input technique (e.g., movement of a cursor, motion capture, facial recognition, gesture detection, voice recognition, actuation of buttons, etc.).

The GUI 3000 may include a data display region 3002, a data analysis region 3004, a scientific instrument control region 3006, and a settings region 3008. The particular number and arrangement of regions depicted in FIG. 6 is simply illustrative, and any number and arrangement of regions, including any desired features, may be included in a GUI 3000. The data display region 3002 may display data generated by a scientific instrument (e.g., the scientific instrument 5010 discussed herein with reference to FIG. 8).

The data analysis region 3004 may display the results of data analysis (e.g., the results of analyzing the data illustrated in the data display region 3002 and/or other data). For example, the data analysis region 3004 depict the peak data for each of the injections with a sequence determined, for example, according to method 2000 discussed herein with reference to FIG. 2). In some embodiments, the data display region 3002 and the data analysis region 3004 may be combined in the GUI 3000 (e.g., to include data output from a scientific instrument, and some analysis of the data, in a common graph or region).

The scientific instrument control region 3006 may include options that allow the user to control a scientific instrument (e.g., the scientific instrument 5010 discussed herein with reference to FIG. 8). The settings region 3008 may include options that allow the user to control the features and functions of the GUI 3000 (and/or other GUIs) and/or perform common computing operations with respect to the data display region 3002 and data analysis region 3004 (e.g., providing sequence data, saving data on a storage device, such as the storage device 4004 discussed herein with reference to FIG. 7, sending data to another user, labeling data, etc.).

Computing Device

As noted above, the scientific instrument support module 1000 may be implemented by one or more computing devices. FIG. 7 is a block diagram of a computing device 4000 that may perform some or all of the scientific instrument support methods disclosed herein, in accordance with various embodiments. In some embodiments, the scientific instrument support module 1000 may be implemented by a single computing device 4000 or by multiple computing devices 4000. Further, as discussed below, a computing device 4000 (or multiple computing devices 4000) that implements the scientific instrument support module 1000 may be part of one or more of the scientific instrument 5010, the user local computing device 5020, the service local computing device 5030, or the remote computing device 5040 of FIG. 8.

The computing device 4000 of FIG. 7 is illustrated as having a number of components, but any one or more of these components may be omitted or duplicated, as suitable for the application and setting. In some embodiments, some or all of the components included in the computing device 4000 may be attached to one or more motherboards and enclosed in a housing (e.g., including plastic, metal, and/or other materials). In some embodiments, some these components may be fabricated onto a single system-on-a-chip (SoC) (e.g., an SoC may include one or more processing devices 4002 and one or more storage devices 4004). Additionally, in various embodiments, the computing device 4000 may not include one or more of the components illustrated in FIG. 7, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 4000 may not include a display device 4010, but may include display device interface circuitry (e.g., a connector and driver circuitry) to which a display device 4010 may be coupled.

The computing device 4000 may include a processing device 4002 (e.g., one or more processing devices). As used herein, the term "processing device" may refer to any device or portion of a device that processes electronic data from registers and/or memory to transform that electronic data into other electronic data that may be stored in registers and/or memory. The processing device 4002 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 4000 may include a storage device 4004 (e.g., one or more storage devices). The storage device 4004 may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 4004 may include memory that shares a die with a processing device 4002. In such an embodiment, the memory may be used as cache memory and may include embedded dynamic random access memory (eDRAM) or spin transfer torque magnetic random access memory (STT-MRAM), for example. In some embodiments, the storage device 4004 may include non-transitory computer readable media having instructions thereon that, when executed by one or more processing devices (e.g., the processing device 4002), cause the computing device 4000 to perform any appropriate ones of or portions of the methods disclosed herein.

The computing device 4000 may include an interface device 4006 (e.g., one or more interface devices 4006). The interface device 4006 may include one or more communication chips, connectors, and/or other hardware and software to govern communications between the computing device 4000 and other computing devices. For example, the interface device 4006 may include circuitry for managing wireless communications for the transfer of data to and from the computing device 4000. The term "wireless" and its derivatives may be used to describe circuits, devices, systems, methods, techniques, communications channels, and the like, that may communicate data through the use of modulated electromagnetic radiation through a nonsolid medium. The term does not imply that the associated devices do not contain any wires, although in some embodiments they might not. Circuitry included in the interface device 4006 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). In some embodiments, circuitry included in the interface device 4006 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 4006 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 4006 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 4006 may include one or more antennas (e.g., one or more antenna arrays) to receipt and/or transmission of wireless communications.

In some embodiments, the interface device 4006 may include circuitry for managing wired communications, such as electrical, optical, or any other suitable communication protocols. For example, the interface device 4006 may include circuitry to support communications in accordance with Ethernet technologies. In some embodiments, the interface device 4006 may support both wireless and wired communication, and/or may support multiple wired communication protocols and/or multiple wireless communication protocols. For example, a first set of circuitry of the interface device 4006 may be dedicated to shorter-range wireless communications such as Wi-Fi or Bluetooth, and a second set of circuitry of the interface device 4006 may be dedicated to longer-range wireless communications such as global positioning system (GPS), EDGE, GPRS, CDMA, WiMAX, LTE, EV-DO, or others. In some embodiments, a first set of circuitry of the interface device 4006 may be dedicated to wireless communications, and a second set of circuitry of the interface device 4006 may be dedicated to wired communications.

The computing device 4000 may include battery/power circuitry 4008. The battery/power circuitry 4008 may include one or more energy storage devices (e.g., batteries or capacitors) and/or circuitry for coupling components of the computing device 4000 to an energy source separate from the computing device 4000 (e.g., AC line power).

The computing device 4000 may include a display device 4010 (e.g., multiple display devices). The display device 4010 may include any visual indicators, such as a heads-up display, a computer monitor, a projector, a touchscreen display, a liquid crystal display (LCD), a light-emitting diode display, or a flat panel display.

The computing device 4000 may include other input/output (I/O) devices 4012. The other I/O devices 4012 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 4000, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 4000 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra-mobile personal computer, etc.), a desktop computing device, or a server computing device or other networked computing component.

Scientific Instrument Support System

One or more computing devices implementing any of the scientific instrument support modules or methods disclosed herein may be part of a scientific instrument support system. FIG. 8 is a block diagram of an example scientific instrument support system 5000 in which some or all of the scientific instrument support methods disclosed herein may be performed, in accordance with various embodiments. The scientific instrument support modules and methods disclosed herein (e.g., the scientific instrument support module 1000 of FIG. 1 and the methods 2000 of FIG. 2) may be implemented by one or more of the scientific instrument 5010, the user local computing device 5020, the service local computing device 5030, or the remote computing device 5040 of the scientific instrument support system 5000.

Any of the scientific instrument 5010, the user local computing device 5020, the service local computing device 5030, or the remote computing device 5040 may include any of the embodiments of the computing device 4000 discussed herein with reference to FIG. 7, and any of the scientific instrument 5010, the user local computing device 5020, the service local computing device 5030, or the remote computing device 5040 may take the form of any appropriate ones of the embodiments of the computing device 4000 discussed herein with reference to FIG. 7.

The scientific instrument 5010, the user local computing device 5020, the service local computing device 5030, or the remote computing device 5040 may each include a processing device 5002, a storage device 5004, and an interface device 5006. The processing device 5002 may take any suitable form, including the form of any of the processing devices 4002 discussed herein with reference to FIG. 7, and the processing devices 5002 included in different ones of the scientific instrument 5010, the user local computing device 5020, the service local computing device 5030, or the remote computing device 5040 may take the same form or different forms. The storage device 5004 may take any suitable form, including the form of any of the storage devices 5004 discussed herein with reference to FIG. 7, and the storage devices 5004 included in different ones of the scientific instrument 5010, the user local computing device 5020, the service local computing device 5030, or the remote computing device 5040 may take the same form or different forms. The interface device 5006 may take any suitable form, including the form of any of the interface devices 4006 discussed herein with reference to FIG. 7, and the interface devices 5006 included in different ones of the scientific instrument 5010, the user local computing device 5020, the service local computing device 5030, or the remote computing device 5040 may take the same form or different forms.

The scientific instrument 5010, the user local computing device 5020, the service local computing device 5030, and the remote computing device 5040 may be in communication with other elements of the scientific instrument support system 5000 via communication pathways 5008. The communication pathways 5008 may communicatively couple the interface devices 5006 of different ones of the elements of the scientific instrument support system 5000, as shown, and may be wired or wireless communication pathways (e.g., in accordance with any of the communication techniques discussed herein with reference to the interface devices 4006 of the computing device 4000 of FIG. 7). The particular scientific instrument support system 5000 depicted in FIG. 8 includes communication pathways between each pair of the scientific instrument 5010, the user local computing device 5020, the service local computing device 5030, and the remote computing device 5040, but this "fully connected" implementation is simply illustrative, and in various embodiments, various ones of the communication pathways 5008 may be absent. For example, in some embodiments, a service local computing device 5030 may not have a direct communication pathway 5008 between its interface device 5006 and the interface device 5006 of the scientific instrument 5010, but may instead communicate with the scientific instrument 5010 via the communication pathway 5008 between the service local computing device 5030 and the user local computing device 5020 and the communication pathway 5008 between the user local computing device 5020 and the scientific instrument 5010.

The scientific instrument 5010 may include any appropriate scientific instrument. In some embodiments, the scientific instrument 5010 includes a mass spectrometer 5012, a liquid chromatograph 5014, an ion source 5016, a cartridge 5018, and an imagine device 5019. Generally, the mass spectrometer 5012 is a device that is used to analyzing ions (e.g., measure the mass-to-charge ratio of ions). In some embodiments, a high voltage power supply is located in the ion source 5016. The mass spectrometer 5012 is in communication with the ion source 5016. Generally, the liquid chromatograph 5014 contains an autosampler for introducing the sample to the chromatographic column (stationary phase) and a high-pressure pump for delivering a mobile phase to elute the sample from the column as a function of time. Generally, the ion source 5016 generates gas-phase ions from the liquid stream eluting from the chromatographic column for subsequent analysis in the mass spectrometer. In some embodiments, the ion source 5016 functions as a mount for the cartridge 5018 near the inlet of the mass spectrometer 5012.

Generally, the cartridge 5018 is the functional component of the ion source 5016 and principally includes a chromatography column and an electrospray emitter. In some embodiments, high voltage is applied to the liquid stream to generate an electrospray. In some embodiments, nebulization gas is applied to assist the electrospray plume and aid in stability. In some embodiments, the column may be maintained in a thermally controlled environment (e.g., heated or cooled), depending on the type of chromatography practiced. The storage device 5004 is employed to store historic and diagnostic data. In some embodiments, the storage device 5004 is included on or attached to the cartridge.

Generally, the imaging device (e.g., a camera) 5019 is employed for imaging the electrospray emitter and inlet. In some embodiments, the imaging device 5019 includes a light-emitting diode (LED) that is employed for imaging the electrospray. In some embodiments, the imaging device 5019 is in communication with the cartridge 5018. In some embodiments, the imaging device 5019 communicates bidirectionally with the mass spectrometer 5012.

The user local computing device 5020 may be a computing device (e.g., in accordance with any of the embodiments of the computing device 4000 discussed herein) that is local to a user of the scientific instrument 5010. In some embodiments, the user local computing device 5020 may also be local to the scientific instrument 5010, but this need not be the case; for example, a user local computing device 5020 that is in a user's home or office may be remote from, but in communication with, the scientific instrument 5010 so that the user may use the user local computing device 5020 to control and/or access data from the scientific instrument 5010. In some embodiments, the user local computing device 5020 may be a laptop, smartphone, or tablet device. In some embodiments the user local computing device 5020 may be a portable computing device.

The service local computing device 5030 may be a computing device (e.g., in accordance with any of the embodiments of the computing device 4000 discussed herein) that is local to an entity that services the scientific instrument 5010. For example, the service local computing device 5030 may be local to a manufacturer of the scientific instrument 5010 or to a third-party service company. In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to receive data regarding the operation of the scientific instrument 5010, the user local computing device 5020, and/or the remote computing device 5040 (e.g., the results of self-tests of the scientific instrument 5010, calibration coefficients used by the scientific instrument 5010, the measurements of sensors associated with the scientific instrument 5010, etc.). In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to transmit data to the scientific instrument 5010, the user local computing device 5020, and/or the remote computing device 5040 (e.g., to update programmed instructions, such as firmware, in the scientific instrument 5010, to initiate the performance of test or calibration sequences in the scientific instrument 5010, to update programmed instructions, such as software, in the user local computing device 5020 or the remote computing device 5040, etc.). A user of the scientific instrument 5010 may utilize the scientific instrument 5010 or the user local computing device 5020 to communicate with the service local computing device 5030 to report a problem with the scientific instrument 5010 or the user local computing device 5020, to request a visit from a technician to improve the operation of the scientific instrument 5010, to order consumables or replacement parts associated with the scientific instrument 5010, or for other purposes.

The remote computing device 5040 may be a computing device (e.g., in accordance with any of the embodiments of the computing device 4000 discussed herein) that is remote from the scientific instrument 5010 and/or from the user local computing device 5020. In some embodiments, the remote computing device 5040 may be included in a datacenter or other large-scale server environment. In some embodiments, the remote computing device 5040 may include network-attached storage (e.g., as part of the storage device 5004). The remote computing device 5040 may store data generated by the scientific instrument 5010, perform analyses of the data generated by the scientific instrument 5010 (e.g., in accordance with programmed instructions), facilitate communication between the user local computing device 5020 and the scientific instrument 5010, and/or facilitate communication between the service local computing device 5030 and the scientific instrument 5010.

In some embodiments, one or more of the elements of the scientific instrument support system 5000 illustrated in FIG. 8 may not be present. Further, in some embodiments, multiple ones of various ones of the elements of the scientific instrument support system 5000 of FIG. 8 may be present. For example, a scientific instrument support system 5000 may include multiple user local computing devices 5020 (e.g., different user local computing devices 5020 associated with different users or in different locations). In another example, a scientific instrument support system 5000 may include multiple scientific instruments 5010, all in communication with service local computing device 5030 and/or a remote computing device 5040; in such an embodiment, the service local computing device 5030 may monitor these multiple scientific instruments 5010, and the service local computing device 5030 may cause updates or other information may be "broadcast" to multiple scientific instruments 5010 at the same time. Different ones of the scientific instruments 5010 in a scientific instrument support system 5000 may be located close to one another (e.g., in the same room) or farther from one another (e.g., on different floors of a building, in different buildings, in different cities, and the like.). In some embodiments, a scientific instrument 5010 may be connected to an Internet-of-Things (IoT) stack that allows for command and control of the scientific instrument 5010 through a web-based application, a virtual or augmented reality application, a mobile application, and/or a desktop application. Any of these applications may be accessed by a user operating the user local computing device 5020 in communication with the scientific instrument 5010 by the intervening remote computing device 5040. In some embodiments, a scientific instrument 5010 may be sold by the manufacturer along with one or more associated user local computing devices 5020 as part of a local scientific instrument computing unit 5012.

In some such embodiments, the remote computing device 5040 and/or the user local computing device 5020 may combine data from different types of scientific instruments 5010 included in a scientific instrument support system 5000.

The following paragraphs provide various examples of the embodiments disclosed herein.

Example 1 is a scientific instrument support apparatus including first logic to receive, from a mass spectrometer, injections data for each of a plurality of injections associated with a sample; second logic to determine peak data for each of the plurality of injections by executing, in parallel on a node, a peak detection algorithm for each of the plurality of injections; third logic to collate the peak data for each of the plurality of injections; and fourth logic to provide the collated peak data for further processing.

Example 2 includes the subject matter of Example 1, and further specifies that the node comprise a virtual machine or a physical machine.

Example 3 includes the subject matter of Example 1 or 2, and further specifies that the node is executed on at least one of a plurality of processing devices.

Example 4 includes the subject matter of any of Examples 1-3, and further specifies that the scientific instrument support apparatus comprises the plurality of processing devices.

Example 5 includes the subject matter of any of Examples 1-4, and further specifies that the each of the plurality of processing devices is comprised within a separate physical server.

Example 6 includes the subject matter of any of Examples 1-5, and further specifies that the second logic employs a Kubernetes infrastructure to execute each of the peak detection algorithms in parallel.

Example 7 includes the subject matter of any of Examples 1-6, and further specifies that the peak detection algorithms is executed within a pod comprising virtual memory and virtual processing.

Example 8 includes the subject matter of any of Examples 1-7, and further specifies that each pod's virtual memory and virtual processing is separate from the other pods.

Example 9 includes the subject matter of any of Examples 1-8, and further specifies that a configuration for each of the pods is based on a type of peak detection algorithm executed.

Example 10 includes the subject matter of any of Examples 1-9, and further specifies that the type of peak detection algorithm includes at least one selected from a group consisting of ICIS, GENISIS, and Cobra.

Example 11 includes the subject matter of any of Examples 1-10, and further specifies that before the respective peak detection algorithm is execute, the second logic extracts a raw file corresponding to the respective injection of the plurality of injections.

Example 12 includes the subject matter of any of Examples 1-11, and further includes fifth logic to cause the display of the peak data for each of the injections.

Example 13 includes the subject matter of any of Examples 1-12, and further includes fifth logic to determine a composition of the sample based on the collated peak data.

Example 14 includes the subject matter of any of Examples 1-13, and further specifies that the peak detection algorithm is optimized for a Linux container.

Example 15 includes the subject matter of any of Examples 1-14, and further specifies that the peak data is collated based on the plurality of injections.

Example 16 is a method, for providing scientific instrument support that is executed by a processing device. The method includes receiving, from a mass spectrometer, injections data for each of a plurality of injections associated with a sample; determining peak data for each of the plurality of injections by executing, in parallel on a node, a peak detection algorithm for each of the plurality of injections; collating the peak data for each of the plurality of injections; determining a composition of the sample based on the collated peak data; and providing the composition of the same for display.

Example 17 includes the subject matter of Example 16, and further includes providing the peak data for each of the injections for further processing.

Example 18 includes the subject matter of Example 16 or 17, and further specifies that the node comprise a virtual machine or a physical machine.

Example 19 includes the subject matter of any of Example 16-18, and further specifies that the node is executed on at least one of a plurality of processing devices.

Example 20 includes the subject matter of any of Examples 16-19, and further specifies that a scientific instrument support apparatus comprises the plurality of processing devices.

Example 21 includes the subject matter of any of Examples 16-20, and further specifies that the each of the plurality of processing devices is comprised within a separate physical server.

Example 22 includes the subject matter of any of Examples 16-21, and further specifies that the second logic employs a Kubernetes infrastructure to execute each of the peak detection algorithms in parallel.

Example 23 includes the subject matter of any of Examples 16-22, and further specifies that the peak detection algorithms is executed within a pod comprising virtual memory and virtual processing.

Example 24 includes the subject matter of any of Examples 16-23, and further specifies that each pod's virtual memory and virtual processing is separate from the other pods.

Example 25 includes the subject matter of any of Examples 16-24, and further specifies that a configuration for each of the pods is based on a type of peak detection algorithm executed.

Example 26 includes the subject matter of any of Examples 16-25, and further specifies that the type of peak detection algorithm includes at least one selected from a group consisting of ICIS, GENISIS, and Cobra.

Example 27 includes the subject matter of any of Examples 16-26, and further specifies that before the respective peak detection algorithm is execute, the second logic extracts a raw file corresponding to the respective injection of the plurality of injections.

Example 28 includes the subject matter of any of Examples 16-27, and further includes fifth logic to cause the display of the peak data for each of the injections.

Example 29 includes the subject matter of any of Examples 16-28, and further specifies that the peak detection algorithm is optimized for a Linux container.

Example 30 includes the subject matter of any of Examples 16-29, and further specifies that the peak data is collated based on the plurality of injections.

Example 31 is a scientific instrument support system that includes a mass spectrometer and a first processing device. The first processing device is configured to receive, from the mass spectrometer, injections data for each of a plurality of injections associated with a sample; determining peak data for each of the plurality of injections by executing, in parallel on a node, a peak detection algorithm for each of the plurality of injections, wherein the node is executed by a second processing device; collating the peak data for each of the injections; and providing the collated peak data for further processing.

Example 32 includes the subject matter of Example 31, and further specifies that each of the peak detection algorithms is executed within a pod comprising virtual memory and virtual processing.

Example 33 includes the subject matter of Example 31 or 32, and further specifies that wherein each pod's virtual memory and virtual processing is separate from the other pods.

Example 34 includes the subject matter of any of Example 31-33, and further specifies that the peak data is collated based on the plurality of injections.

Example 35 includes the subject matter of any of Example 31-34, and further specifies that the node comprise a virtual machine or a physical machine.

Example 36 includes the subject matter of any of Example 31-35, and further specifies that the node is executed on at least one of a plurality of processing devices.

Example 37 includes the subject matter of any of Examples 31-36, and further specifies that the scientific instrument support apparatus comprises the plurality of processing devices.

Example 38 includes the subject matter of any of Examples 31-37, and further specifies that the each of the plurality of processing devices is comprised within a separate physical server.

Example 39 includes the subject matter of any of Examples 31-38, and further specifies that the second logic employs a Kubernetes infrastructure to execute each of the peak detection algorithms in parallel.

Example 40 includes the subject matter of any of Examples 31-39, and further specifies that a configuration for each of the pods is based on a type of peak detection algorithm executed.

Example 41 includes the subject matter of any of Examples 31-40, and further specifies that the type of peak detection algorithm includes at least one selected from a group consisting of ICIS, GENISIS, and Cobra.

Example 42 includes the subject matter of any of Examples 31-41, and further specifies that before the respective peak detection algorithm is execute, the second logic extracts a raw file corresponding to the respective injection of the plurality of injections.

Example 43 includes the subject matter of any of Examples 31-42, and further includes fifth logic to cause the display of the peak data for each of the injections.

Example 44 includes the subject matter of any of Examples 31-43, and further includes fifth logic to determine a composition of the sample based on the collated peak data.

Example 45 includes the subject matter of any of Examples 31-44, and further specifies that the peak detection algorithm is optimized for a Linux container.

The invention claimed is:

1. A scientific instrument support apparatus, comprising:

first logic to receive, from a mass spectrometer, injections data for each of a plurality of injections associated with a sample;

second logic to determine peak data for each of the plurality of injections by executing, in parallel on a node, a peak detection algorithm for each of the plurality of injections;

third logic to collate the peak data for each of the plurality of injections; and fourth logic to provide the collated peak data for further processing.

2. The scientific instrument support apparatus of claim 1, wherein the node comprise a virtual machine or a physical machine.

3. The scientific instrument support apparatus of claim 1, wherein the node is executed on at least one of a plurality of processing devices.

4. The scientific instrument support apparatus of claim 3, further comprising the plurality of processing devices.

5. The scientific instrument support apparatus of claim 3, wherein each of the plurality of processing devices is comprised within a separate physical server.

6. The scientific instrument support apparatus of claim 1, wherein the second logic employs a Kubernetes infrastructure to execute each of the peak detection algorithms in parallel.

7. The scientific instrument support apparatus of claim 6, wherein each of the peak detection algorithms is executed within a pod comprising virtual memory and virtual processing.

8. The scientific instrument support apparatus of claim 7, wherein each pod's virtual memory and virtual processing is separate from the other pods.

9. The scientific instrument support apparatus of claim 7, wherein a configuration for each of the pods is based on a type of peak detection algorithm executed.

10. The scientific instrument support apparatus of claim 9, wherein the type of peak detection algorithm includes at least one selected from a group consisting of ICIS, GENISIS, and Cobra.

11. The scientific instrument support apparatus of claim 1, wherein, before the respective peak detection algorithm is execute, the second logic extracts a raw file corresponding to the respective injection of the plurality of injections.

12. The scientific instrument support apparatus of claim 1, further comprising fifth logic to cause the display of the peak data for each of the injections.

13. The scientific instrument support apparatus of claim 1, further comprising fifth logic to determine a composition of the sample based on the collated peak data.

14. The scientific instrument support apparatus of claim 1, wherein the peak detection algorithm is optimized for a Linux container.

15. A method, executed by a processing device, for providing scientific instrument support, the method comprising:

receiving, from a mass spectrometer, injections data for each of a plurality of injections associated with a sample;

determining peak data for each of the plurality of injections by executing, in parallel on a node, a peak detection algorithm for each of the plurality of injections;

collating the peak data for each of the plurality of injections;

determining a composition of the sample based on the collated peak data; and providing the composition of the sample for display.

16. The method of claim 15, further comprising providing the peak data for each of the injections for further processing.

17. A scientific instrument support system, comprising:

a mass spectrometer; and a first processing device configured to:

receive, from the mass spectrometer, injections data for each of a plurality of injections associated with a sample;

determining peak data for each of the plurality of injections by executing, in parallel on a node, a peak detection algorithm for each of the plurality of injections, wherein the node is executed by a second processing device;

collating the peak data for each of the injections; and providing the collated peak data for further processing.

18. The scientific instrument support system of claim 17, wherein each of the peak detection algorithms is executed within a pod comprising virtual memory and virtual processing.

19. The scientific instrument support system of claim 18, wherein each pod's virtual memory and virtual processing is separate from the other pods.

20. The scientific instrument support system of claim 17, wherein the peak data is collated based on the plurality of injections.

* * * * *